United States Patent
Gu (10) Patent No.: US 10,506,245 B2
(45) Date of Patent: Dec. 10, 2019

(54) VIDEO DATA PROCESSING USING A RING BUFFER

(71) Applicant: Cybrook Inc., Santa Clara, CA (US)

(72) Inventor: Qunshan Gu, Santa Clara, CA (US)

(73) Assignee: Cybrook Inc., Santa Clara, CA (US)

( * ) Notice: Subject to any disclaimer, the term of this patent is extended or adjusted under 35 U.S.C. 154(b) by 217 days.

(21) Appl. No.: 14/944,380

(22) Filed: Nov. 18, 2015

(65) Prior Publication Data

US 2017/0142433 A1    May 18, 2017

(51) Int. Cl.
| | |
|---|---|
| *H04L 1/00* | (2006.01) |
| *H04N 19/44* | (2014.01) |
| *H04L 12/823* | (2013.01) |
| *H04N 21/44* | (2011.01) |
| *H04N 19/89* | (2014.01) |
| *H04N 19/172* | (2014.01) |
| *H04N 19/107* | (2014.01) |
| *H04N 19/166* | (2014.01) |
| *H04N 19/169* | (2014.01) |

(52) U.S. Cl.
CPC ........... *H04N 19/44* (2014.11); *H04L 1/0045* (2013.01); *H04L 47/32* (2013.01); *H04N 19/89* (2014.11); *H04N 21/44004* (2013.01); *H04N 19/107* (2014.11); *H04N 19/166* (2014.11); *H04N 19/172* (2014.11); *H04N 19/188* (2014.11)

(58) Field of Classification Search
CPC ...................................................... H04N 19/44
See application file for complete search history.

(56) References Cited

U.S. PATENT DOCUMENTS

| | | | | |
|---|---|---|---|---|
| 5,398,072 A | * | 3/1995 | Auld .................. | H04N 21/4302 348/715 |
| 5,724,091 A | * | 3/1998 | Freeman ........... | G06F 17/30017 348/E5.096 |
| 6,985,501 B2 | | 1/2006 | Suzuki et al. | |

(Continued)

FOREIGN PATENT DOCUMENTS

| | | |
|---|---|---|
| CN | 1223192 A | 7/1999 |
| CN | 1321026 A | 11/2001 |

(Continued)

OTHER PUBLICATIONS

ADV202 spec, used by Perry.*

*Primary Examiner* — Jayanti K Patel
*Assistant Examiner* — Shadan E Haghani
(74) *Attorney, Agent, or Firm* — Young Basile Hanlon & MacFarlane, P.C.

(57) ABSTRACT

Systems, apparatuses, and methods for decoding a video sequence includes: receiving, by a ring buffer of the computer device, a packet associated with a frame of the video sequence; based on a determination that the frame occurs later in time than the most recent frame outputted from the ring buffer, determining whether the frame is stored in the ring buffer; when the frame is stored in the ring buffer, determining whether all packets associated with the frame have been received by the ring buffer; and when all packets associated with the frame have been received by the ring buffer and a preceding frame has been outputted from the ring buffer, outputting the frame from the ring buffer, where the preceding frame occurs immediately prior to the frame in the video sequence.

20 Claims, 9 Drawing Sheets

(56) References Cited

U.S. PATENT DOCUMENTS

| | | | |
|---|---|---|---|
| 7,042,948 B2 * | 5/2006 | Kim | H03M 7/30 |
| | | | 348/E5.067 |
| 7,809,850 B2 | 10/2010 | Shimizu et al. | |
| 7,969,883 B2 | 6/2011 | Balint et al. | |
| 8,081,635 B2 | 12/2011 | Bekiares et al. | |
| 8,843,809 B2 * | 9/2014 | Sugiura | H04L 1/0041 |
| | | | 714/776 |
| 9,210,419 B2 * | 12/2015 | Barrett | H04L 43/0829 |
| 9,615,087 B2 | 4/2017 | Amon et al. | |
| 9,615,139 B2 * | 4/2017 | Rodriguez | G06F 3/14 |
| 9,756,356 B2 * | 9/2017 | Yang | H04N 19/895 |
| 9,942,119 B2 | 4/2018 | Kruger | |
| 2002/0009054 A1 | 1/2002 | Suzuki et al. | |
| 2002/0071654 A1 * | 6/2002 | Notoya | H04N 9/8042 |
| | | | 386/331 |
| 2006/0168104 A1 | 7/2006 | Shimizu et al. | |
| 2008/0151775 A1 | 6/2008 | Balint et al. | |
| 2008/0172708 A1 * | 7/2008 | Perry | H04W 72/005 |
| | | | 725/110 |
| 2009/0070610 A1 | 3/2009 | Nishida et al. | |
| 2010/0085963 A1 | 4/2010 | Bekiares et al. | |
| 2010/0165846 A1 * | 7/2010 | Yamaguchi | H04B 7/15592 |
| | | | 370/236 |
| 2011/0280307 A1 | 11/2011 | MacInnis et al. | |
| 2011/0289544 A1 | 11/2011 | Goosen et al. | |
| 2012/0028567 A1 | 2/2012 | Marko | |
| 2012/0030769 A1 * | 2/2012 | De Laet | H04N 7/16 |
| | | | 726/26 |
| 2013/0300940 A1 | 11/2013 | Amon et al. | |
| 2015/0103846 A1 * | 4/2015 | Dung Dao | H04L 47/2416 |
| | | | 370/437 |
| 2016/0234088 A1 | 8/2016 | Kruger | |
| 2017/0070743 A1 * | 3/2017 | Zhou | H04N 19/44 |

FOREIGN PATENT DOCUMENTS

| | | |
|---|---|---|
| CN | 1960315 A | 5/2007 |
| CN | 104375952 A | 2/2015 |
| CN | 104703051 A | 6/2015 |

* cited by examiner

VIDEO DATA PROCESSING USING A RING BUFFER

TECHNICAL FIELD

This disclosure relates to video encoding and decoding and particularly to video coding and decoding using a ring buffer.

BACKGROUND

Digital video streams can be encoded to efficiently compress the video into a digital bitstream for storage on non-transitory digital media or streaming transmission through bandwidth-limited communication channels. However, packet loss and other errors may occur during video bitstream transmission or storage, resulting in errors in decoding the bitstream. It is also common that the available channel bandwidth may change from time to time, causing problems in real-time video transmission.

SUMMARY

This disclosure includes aspects of systems, methods and apparatuses for decoding a video bitstream with a computing device including receiving, at a ring buffer, one or more packets associated with a plurality of frames included in the video bitstream and determining whether one or more frames of the plurality of frames are associated with the one or more packets. When the one or more frames are associated with the one or more packets, determining whether to output the one or more frames from the ring buffer to a forward error correction decoder based on the one or more packets and when the one or more frames are output to the forward error correction decoder: performing forward error correction on the one or more frames, outputting the one or more frames from the forward error correction decoder to a decoder, decoding the one or more frames, outputting the one or more frames from the decoder to a renderer and rendering the one or more frames for display.

Another aspect of a disclosed implementation is an apparatus for decoding video bitstreams including a memory and a processor operative to execute instructions stored in the memory to receive, at a ring buffer, one or more packets associated with a plurality of frames included in the video bitstream and determine whether one or more frames of the plurality of frames are associated with the one or more packets. When the one or more frames are associated with the one or more packets, determine whether to output the one or more frames from the ring buffer to a forward error correction decoder based on the one or more packets and when the one or more frames are output to the forward error correction decoder: perform forward error correction on the one or more frames, output the one or more frames from the forward error correction decoder to a decoder; decode the one or more frames, output the one or more frames from the decoder to a renderer and render the one or more frames for display.

Another aspect of a disclosed implementation is a system for decoding a video bitstream with a computing device. The system includes a ring buffer, a forward error correction decoder, a decoder and a renderer. The ring buffer is operative to receive one or more packets associated with a plurality of frames included in the video bitstream, associate the one or more packets with one or more frames of the plurality of frames and determine whether to output the one or more frames based on the one or more packets. The forward error correction decoder is operative to receive one or more frames output by the ring buffer, perform forward error correction on the one or more frames and output the one or more frames. The decoder is operative to receive one or more frames output by the forward error correction decoder, decode one or more frames and output the one or more frames. The renderer is operative to receive one or more frames output by the decoder and render the one or more frames for display.

These and other aspects are described in additional detail below.

BRIEF DESCRIPTION OF THE DRAWINGS

This disclosure refers to the accompanying drawings, where like reference numerals refer to like parts throughout the several views and wherein.

DETAILED DESCRIPTION

Digital video can be used for entertainment, video conferencing, advertising and general information sharing. User expectation for digital video quality can be high, as users expect video over shared internet networks with limited bandwidth to have the same high spatial and temporal quality as video broadcast over dedicated cable channels. Digital video encoding can compress a digital video bitstream to permit high-quality digital video to be transmitted over a network having limited bandwidth, for example. Digital video quality can be defined as the degree to which output decompressed and decoded digital video matches the input digital video, for example.

Video encoding and decoding incorporate techniques that compress and decompress digital video streams to permit transmission of high quality digital video streams over networks that can have limited bandwidth capability. These techniques can treat digital video streams as sequences of blocks of digital data and process the blocks to compress the data for transmission or storage and, once received, decompress the blocks to re-create the original digital video stream. Aspects of disclosed implementations can permit transmission of compressed video bitstreams over "noisy" or potentially error inducing networks by performing forward error correction (FEC) on the packets of the video bitstream. Aspects can add FEC packets to the video bitstream to permit detection and correction of missing or corrupt packets. By receiving packets of an FEC protected video bitstream using a ring buffer, aspects can efficiently gather all of the packets belonging to a frame of the video bitstream and emit frames to be FEC decoded.

FEC can, in some cases, reconstruct missing or corrupt packets of a frame using other packets of the frame without requiring retransmission of packets, thereby reducing roundtrip delay. In other instances, missing or corrupt packets cannot be reconstructed by FEC. In these instances, missing or out of order packets can be detected by the ring buffer when a packet from a frame with a frame number greater than the frame number of the oldest frame in the ring buffer is received by the ring buffer before the frame with the oldest frame number is complete. This means that either the packets have been lost in transmission or are being sent out of order. When this occurs, aspects of disclosed implementations can briefly halt the transmission of frames from the ring buffer to the FEC decoder. Transmission of frames can be temporarily halted until either the missing packets associated with the oldest frame number are received or a subsequent frame is complete. If the missing packets associated with the oldest frame are received before a subsequent frame is complete, the oldest frame can be transmitted to the FEC decoder. If the missing packets are not received before all the packets associated with a subsequent frame are received by the ring buffer, the incomplete frame or frames with frame numbers older than the complete subsequent frame can be deleted and the complete subsequent frame can be transmitted to the FEC decoder.

Discarding frames having incomplete or corrupt packets can increase the performance of video encoding and decoding by eliminating the need for retransmission of video data. In cases where re-transmission is required, a message can be passed from the decoder to the encoder via the network and the encoder can then re-transmit the missing frame. This roundtrip messaging and re-transmission of data can result in gaps and delays in the decoded video stream, for example. Aspects of disclosed implementations discard incomplete frames without requiring re-transmission of data, thereby avoiding roundtrip delays.

One problem is that discarded frame or frames can be later required by the decoder in performing inter-prediction. Aspects of disclosed implementation can avoid this by, for example, only using the good reference frames in the decoder buffer on the encoder side so that the discarded frame or frames will not be used by the inter prediction. Whether a frame is successfully reconstructed in the decoder buffer can be determined, for example, by the ring buffer and the decoder, and signaled by the back-channel message to the encoder.

Figure 1:
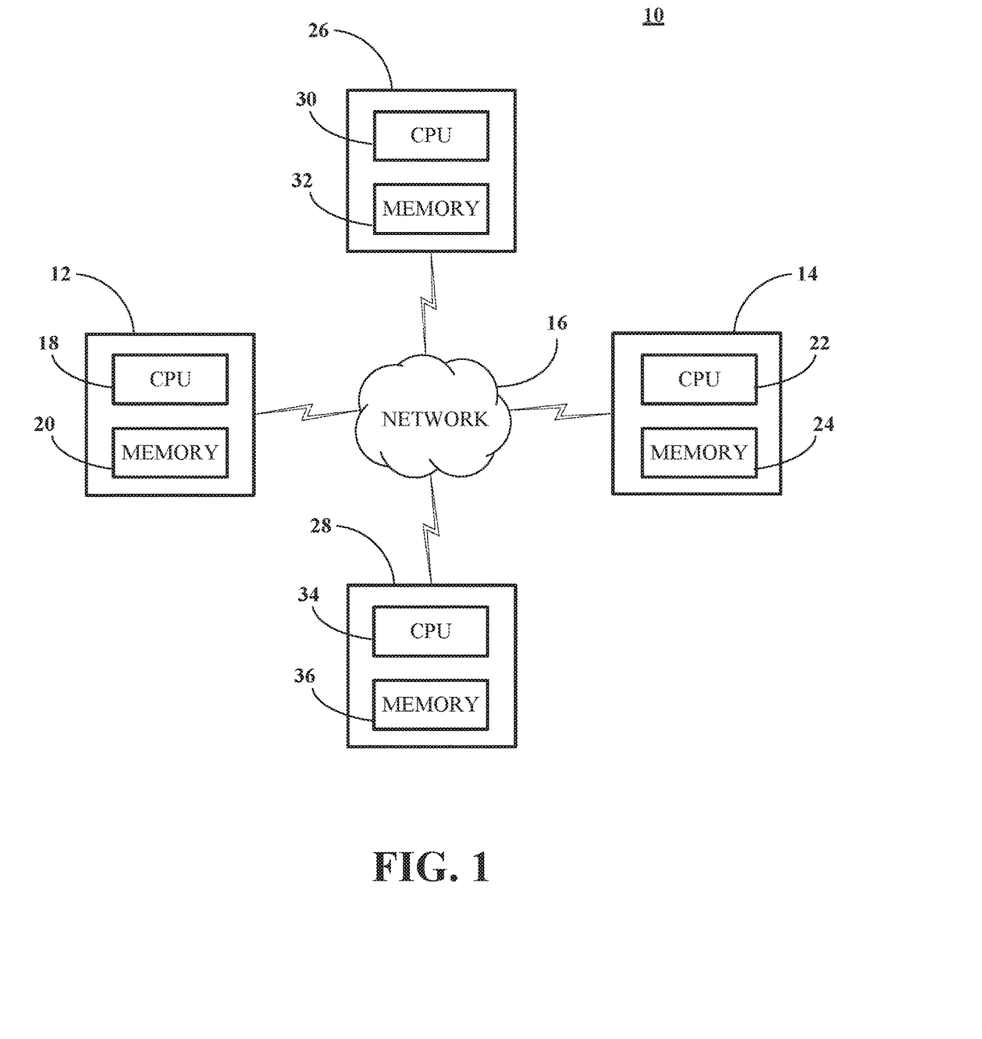
FIG. 1 is a schematic of a video encoding and decoding system in accordance with aspects of disclosed implementations.

FIG. 1 is a schematic of a video encoding and decoding system 10 in which aspects of the disclosure can be implemented. A computing device 12, in one example, can include an internal configuration of hardware including a processor such as a central processing unit (CPU) 18 and a digital data storage exemplified by memory 20. CPU 18 can a controller for controlling the operations of computing device 12, and may be a microprocessor, digital signal processor, field programmable gate array, discrete circuit elements laid out in a custom application specific integrated circuit (ASIC), or any other digital data processor, for example. CPU 18 can be connected to memory 20 by a memory bus, wires, cables, wireless connection, or any other connection, for example. Memory 20 may be or include read-only memory (ROM), random access memory (RAM), optical storage, magnetic storage such as disk or tape, non-volatile memory cards, cloud storage or any other manner or combination of suitable digital data storage device or devices. Memory 20 can store data and program instructions that are used by CPU 18. Other suitable implementations of computing device 12 are possible. For example, the processing of computing device 12 can be distributed among multiple devices communicating over multiple networks 16.

In one example, a network 16 can connect computing device 12 and computing device 14 for encoding and decoding a video stream. For example, the video stream can be encoded in computing device 12 and the encoded video stream is decoded in computing device 14. Network 16 may include any network or networks that are appropriate to the application at hand, such as wired or wireless local or wide area networks, virtual private networks, cellular telephone data networks, or any other wired or wireless configuration of hardware, software, communication protocol suitable to transfer a video bitstream from computing device 12 to computing device 14 and communicate parameters regarding the network from computing device 14 to computing device 12 in the illustrated example.

Computing device 14 can include CPU 22 and memory 24, which can be similar to components as discussed above in conjunction with the system 10. Computing device 14 can be configured to display a video stream, for example. A display connected to computing device 14 and can be implemented in various ways, including by a liquid crystal display (LCD), a cathode-ray tube (CRT), organic or non-organic light emitting diode display (LED), plasma display, or any other mechanism to display a machine-readable video signal to a user. Computing device 14 can be configured to display a rendering of the video bitstream decoded by a decoder in computing device 14, for example.

Other implementations of encoder and decoder system 10 are possible. In addition to computing device 12 and computing device 14, FIG. 1 shows additional computing devices 26, 28 each having one or more CPUs 30, 34 and memories 32, 36 respectively. These computing devices can include servers, and mobile phones, which can also create, encode, decode, store, forward or display digital video streams, for example. Each of these computing devices can have different capabilities in terms of processing power and memory availability, including devices for creating a video such as video cameras and devices for displaying video.

Figure 2:
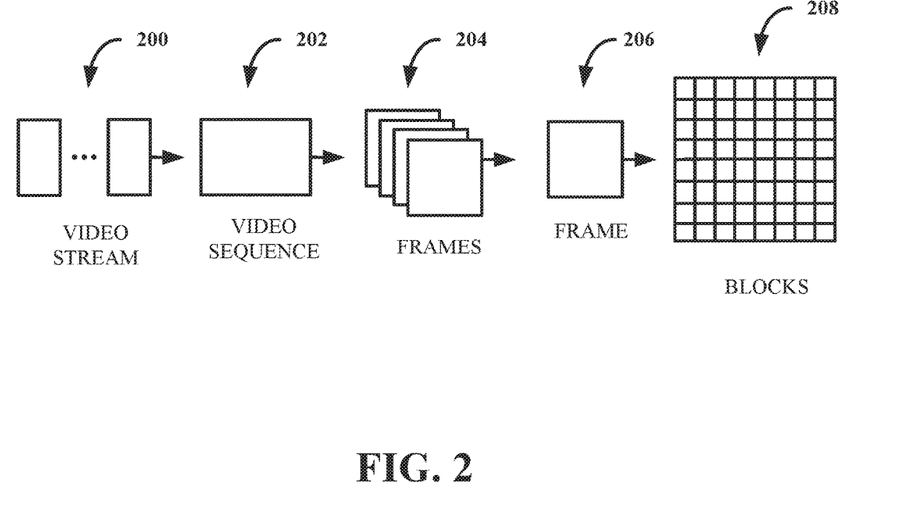
FIG. 2 is a diagram of a video stream in accordance with aspects of disclosed implementations.

FIG. 2 is a diagram of a video stream 200 to be encoded and subsequently decoded. Video stream 200 can include a video sequence 202. A video sequence 202 is a temporally contiguous subset of a video stream, also called a group of pictures (GOP). Video sequence 202 can include a number of adjacent video frames 204. While four frames are depicted in adjacent frames 204, video sequence 202 can include any number of adjacent frames. A single example of the adjacent frames 204 is illustrated as the single frame 206. Further sub-dividing the single frame 206 can yield a series of blocks 208. In this example, blocks 208 can contain data corresponding to a N×M pixel region in frame 206, such as luminance and chrominance data for the corresponding pixels. Blocks 208 can be of any suitable size such as 128×128 pixel groups or any rectangular subset of the pixel group.

Figure 3:
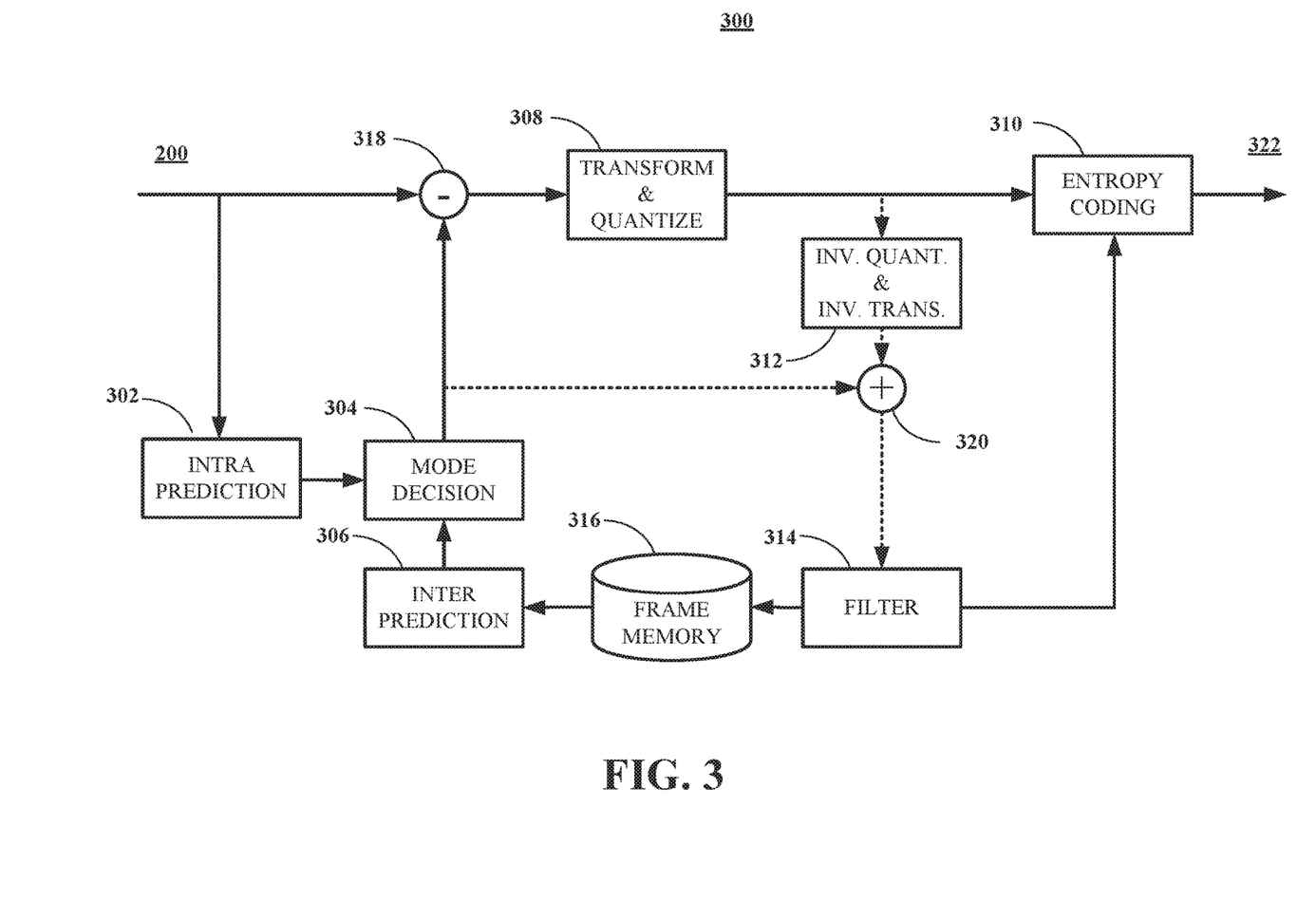
FIG. 3 is a block diagram of a video compression system in accordance with aspects of disclosed implementations.

FIG. 3 is a block diagram of an encoder 300 in accordance with disclosed implementations. Encoder 300 can be implemented in a computing device such as computing device 12. Encoder 300 can encode an input video stream 200. Encoder 300 includes stages to perform the various functions in a forward path to produce an encoded and/or a video bitstream 322: an intra prediction stage 302, mode decision stage 304, an inter prediction stage 306, transform and quantization stage 308, a loop filter stage 314 and an entropy encoding stage 40. Encoder 300 may also include a reconstruction path to reconstruct a frame for prediction and encoding of future blocks. In FIG. 3, encoder 300 includes an inverse quantization and inverse transform stage 312 and a frame memory 316 for storing multiple frames of video data to reconstruct blocks for prediction. Other structural variations of encoder 300 can be used to encode video stream 200.

When video stream 200 is presented for encoding, each frame (such as frame 206 from FIG. 2) within video stream 200 is processed in units of blocks. Each block can be processed separately in raster scan order starting from the upper left block. At intra prediction stage 302 intra prediction residual blocks can be determined for the blocks of video stream 200. Intra prediction can predict the contents of a block by examining previously processed nearby blocks to determine if the pixel values of the nearby blocks are similar to the current block. Since video streams 200 are processed in raster scan order, blocks that occur in raster scan order ahead of the current block are available for processing the current block. Blocks that occur before a given block in raster scan order can be used for intra prediction because they will be available for use at a decoder since they will have already been reconstructed. If a nearby block is similar enough to the current block, the nearby block can be used as a prediction block and subtracted from the current block to form a residual block and information indicating that the current block was intra-predicted can be included in the video bitstream.

Video stream 200 can also be inter predicted at inter prediction stage 306. Inter prediction includes forming a residual block from a current block by translating pixels from a temporally nearby frame to form a prediction block that can be subtracted from the current block. Temporally adjacent frames can be stored in frame memory 316 and accessed by inter prediction stage 306 to form a residual block that can be passed to mode decision stage 304 where the residual block from intra prediction can be compared to the residual block from inter prediction. The mode decision stage 304 can determine which prediction mode, inter or intra, to use to predict the current block. Aspects can use rate distortion value to determine which prediction mode to use, for example.

Rate distortion value can be determined by calculating the number or bits per unit time or bit rate of a video bitstream encoded using particular encoding parameter, such as prediction mode, for example, combined with calculated differences between blocks from the input video stream and blocks in the same position temporally and spatially in the decoded video stream. Since encoder 300 is "lossy", pixel values in blocks from the decoded video stream can differ from pixel values in blocks from the input video stream. Encoding parameters can be varied and respective rate distortion values compared in order to determine optimal parameter values, for example.

At subtraction stage 318 the residual block determined by mode decision stage 304 can be subtracted from the current block and passed to transform and quantization stage 308. Since the values of the residual block can be smaller than the values in the current block, the transformed and quantized residual block can have fewer values than the transformed and quantized current block and therefore be represented by fewer transform coefficients in the video bitstream. Examples of block-based transforms include the Karhunen-Loève Transform (KLT), the Discrete Cosine Transform ("DCT"), and the Singular Value Decomposition Transform ("SVD") to name a few. In one example, the DCT transforms the block into the frequency domain. In the case of DCT, the transform coefficient values are based on spatial frequency, with the DC or other lowest frequency coefficient at the top-left of the matrix and the highest frequency coefficient at the bottom-right of the matrix.

Transform and quantization stage 308 converts the transform coefficients into discrete quantum values, which can be referred to as quantized transform coefficients. Quantization can reduce the number of discrete states represented by the transform coefficients while reducing image quality less than if the quantization were performed in the spatial domain rather than a transform domain. The quantized transform coefficients can then entropy encoded by entropy encoding stage 310. Entropy encoding is a reversible, lossless arithmetic encoding scheme that can reduce the number of bits in the video bitstream that can be decoded without introducing change in the bitstream. The entropy-encoded coefficients, together with other information used to decode the block, such as the type of prediction used, motion vectors, quantizer value and filter strength, are then output as a video bitstream 322.

The reconstruction path in FIG. 3, shown by the dotted connection lines, can be used to help ensure that both encoder 300 and decoder 400 (described below with reference to FIG. 4) use the same reference frames to form intra prediction blocks. The reconstruction path performs functions that are similar to functions performed during the decoding process discussed in more detail below, including dequantizing and inverse transforming the quantized transform coefficients at inverse quantize and inverse transform stage 312, which can be combined with a residual block from mode decision stage 304 at adder 320 to create a reconstructed block. Loop filter stage 314 can be applied to the reconstructed block to reduce distortion such as blocking artifacts since decoder 400 can filter the reconstructed video stream prior to sampling it to form reference frames. FIG. 3 shows loop filter stage 314 sending loop filter parameters to entropy coding stage 310 to be combined with video bitstream 322, to permit decoder 400 to use the same loop filter parameters as encoder 300, for example.

Other variations of encoder 300 can be used to encode video bitstream 322. Encoder 300 stages can be processed in different orders or may be combined into fewer stages or divided into more stages without changing the purpose. For example, a non-transform based encoder 300 can quantize the residual signal directly without transform stage. In another implementation, an encoder 300 may have transform and quantization stage 308 divided into a single stage.

Figure 4:
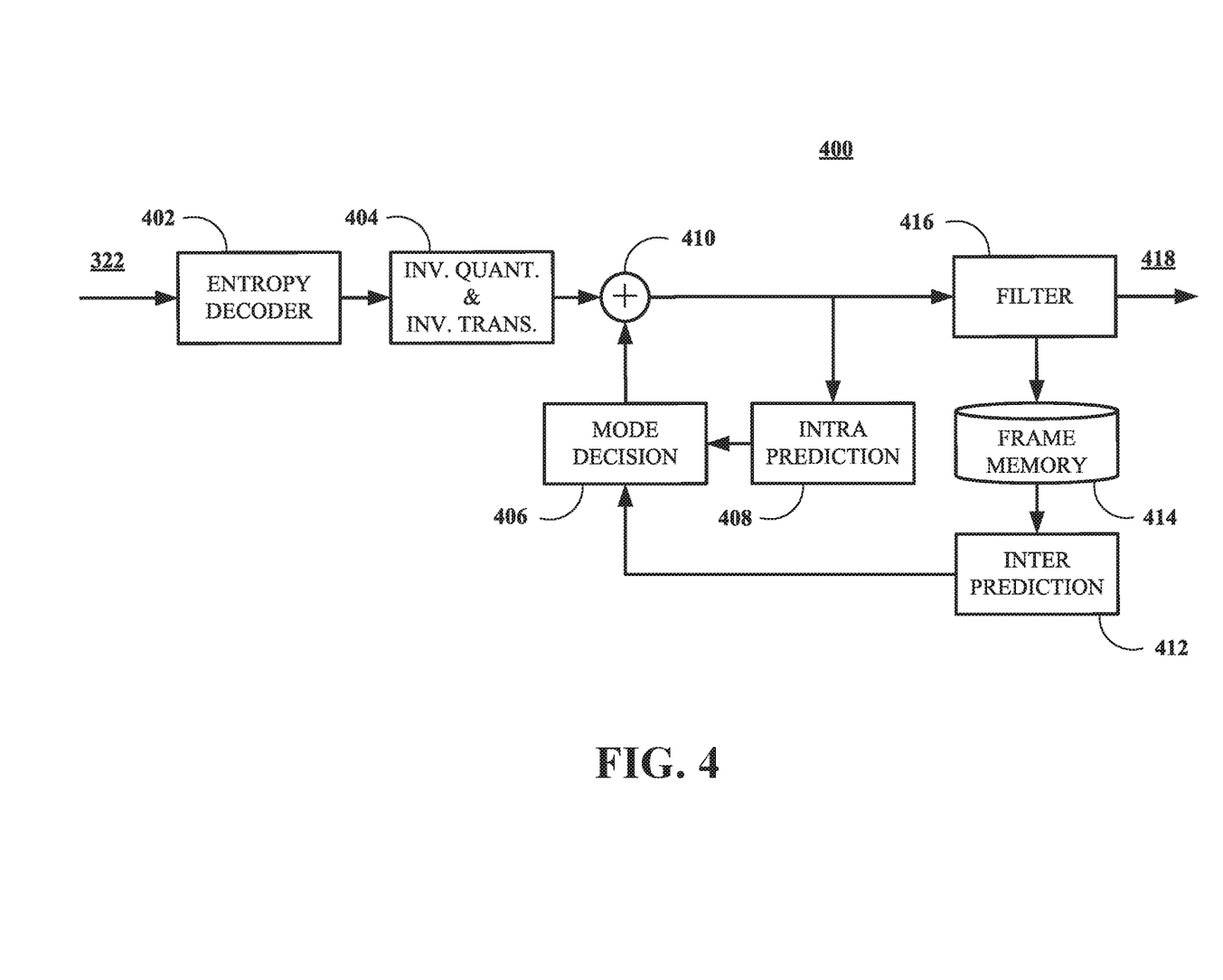
FIG. 4 is a block diagram of a video decompression system in accordance with aspects of disclosed implementations.

FIG. 4 is a block diagram of decoder 400 in according to aspects of disclosed implementations. In one example, decoder 400 can be implemented in computing device 14. Decoder 400 includes the following stages to perform various functions to produce an output video stream 418 from video bitstream 322: entropy decoding stage 402, an inverse quantization and inverse transform stage 404, an intra prediction stage 408, an inter prediction stage 412, an adder 410, a mode decision stage 406 and a frame memory 414. Other structural variations of decoder 400 can be used to decode video bitstream 322. For example, inverse quantization and inverse transform stage 404 can be expressed as two separate stages.

Received video bitstream 322 can be entropy decoded by entropy decoding stage 402. Entropy decoding stage 402 performs an inverse of the entropy coding performed at stage 310 of the encoder 300 to restore the video bitstream to its original state before entropy coding. The restored video bitstream can then be inverse quantized and inverse transformed in a similar fashion to inverse quantize and inverse transform stage 312. Inverse quantize and inverse transform stage 404 can restore residual blocks of the video bitstream 322. Note that since encoder 300 and decoder 400 can represent lossy encoding, the restored residual block can have different pixel values than the residual block from the same temporal and spatial location in the input video stream 200.

Following the restoration of residual blocks at inverse quantize and inverse transform stage 404, the residual blocks of the video bitstream can be then restored to approximate its pre-prediction state by adding prediction blocks to the residual blocks at adder 410. Adder 410 receives the prediction block to be added to residual blocks from the mode decision stage 406. Mode decision stage 406 can interpret parameters included in the video bitstream 322 by encoder 300, for example, to determine whether to use intra or inter prediction to restore a block of the video bitstream 322. Mode decision stage 406 can also perform calculations on the video bitstream 322 to determine which type of prediction to use for a particular block. By performing the same calculations on the same data as the decoder, mode decision stage 406 can make the same decision regarding prediction mode as the encoder 300, thereby reducing the need to transmit bits in the video bitstream to indicate which prediction mode to use.

Mode decision stage 406 can receive prediction blocks from both intra prediction stage 408 and inter prediction stage 412. Intra prediction stage 408 can receive blocks to be used as prediction blocks from the restored video stream output from adder 410 since intra prediction blocks are processed in raster scan order, and since blocks used in intra prediction are selected by encoder 300 to occur in the raster scan order before the residual block to be restored occur, intra prediction stage 408 can provide prediction blocks when required. Inter prediction stage 412 creates prediction blocks from frames stored in frame memory 414 as discussed above in relation to encoder 300. Frame memory 414 receives reconstructed blocks after filtering by loop filter stage 416. Loop filtering can remove blocking artifacts introduced by block-based prediction techniques such as used by encoder 300 and decoder 400 as described herein.

Inter prediction stage 412 can use frames from frame memory 414 following filtering by loop filter stage 416 in order to use the same data for forming prediction blocks as was used by encoder 300. Using the same data for prediction permits decoder 400 to reconstruct blocks to have pixel values close to corresponding input blocks in spite of using lossy compression. Prediction blocks from inter prediction stage 412 are received by mode decision stage 406 can be passed to adder 410 to restore a block of video bitstream 322. Following loop filtering by loop filter stage 416, output video stream 418 can be outputted from decoder 400. Other variations of decoder 400 can be used to decode video bitstream 322. For example, decoder 400 can produce output video stream 418 without loop filter stage 416.

Figure 5:
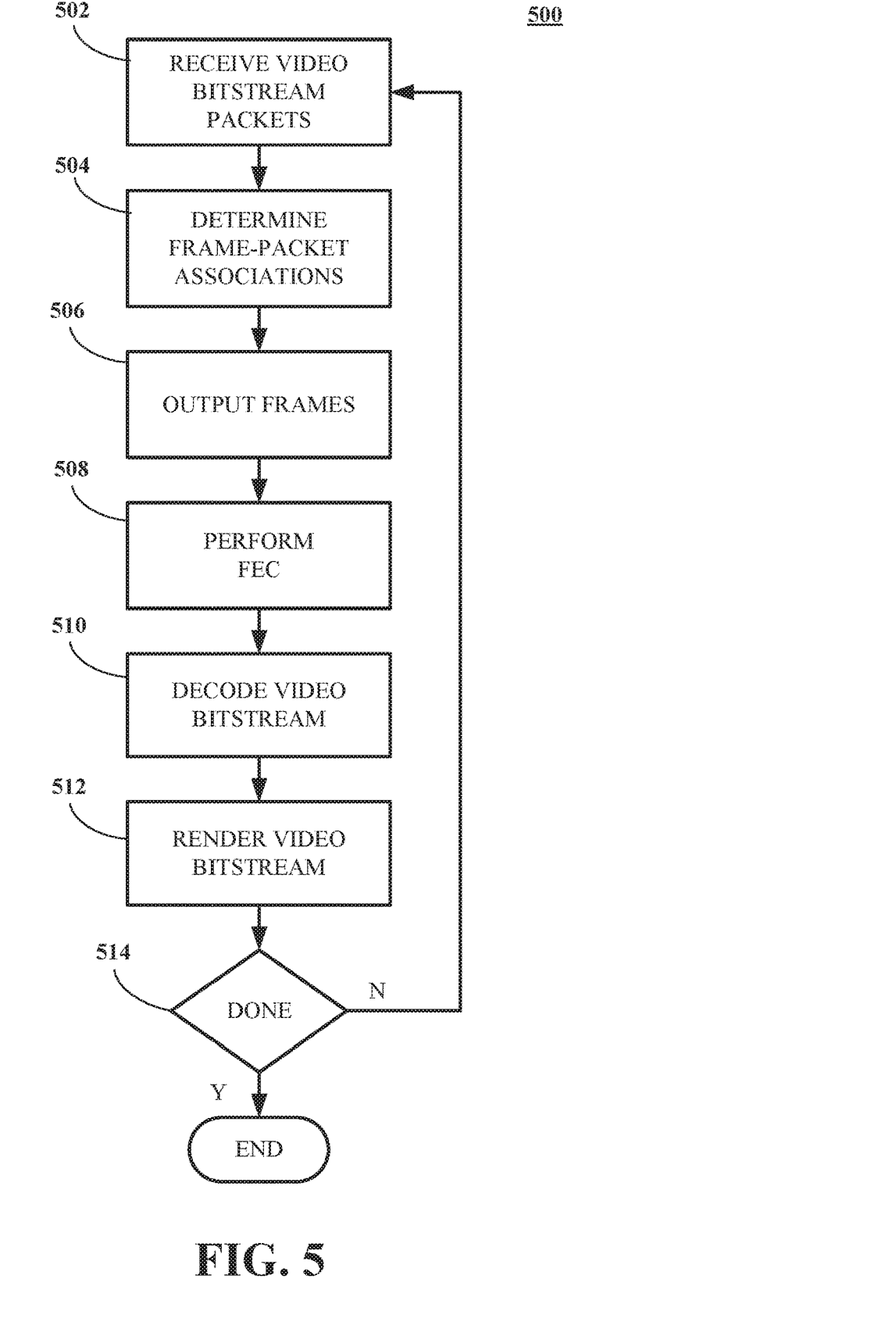
FIG. 5 is a flowchart showing video decoding processing using a ring buffer in accordance with aspects of disclosed implementations.

FIG. 5 is a flowchart showing a process 500 for decoding a video bitstream using ring buffers in accordance with disclosed implementations. Process 500 can be performed by a decoding computing device 14 for example. The flowchart diagram in FIG. 5 shows several steps included in process 500. Process 500 can be accomplished with the steps included herein or with more or fewer steps than included here. For example, steps can be combined or divided to change the number of steps performed. The steps of process 500 can be performed in the order included herein or in different orders and still accomplish the intent of process 500.

Figure 8:
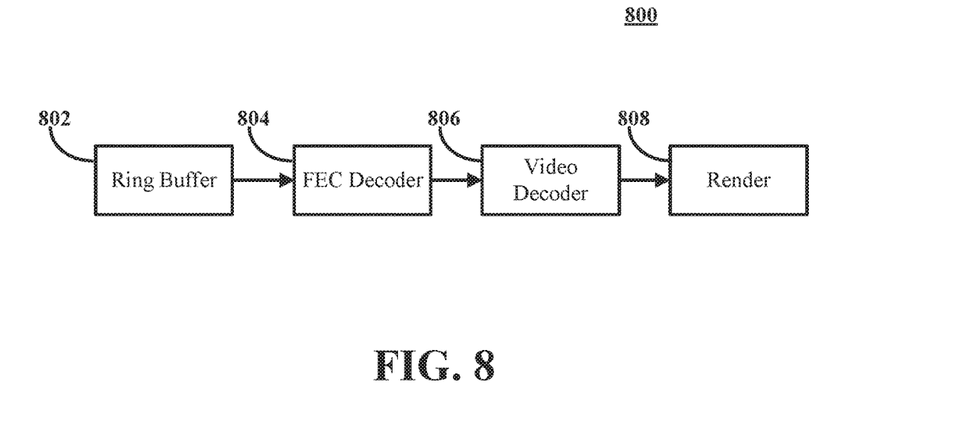
FIG. 8 is a diagram of a system for video decoding processing using a ring buffer in accordance with aspects of disclosed implementations.

Process 500 can be performed by the processing stages shown in FIG. 8. FIG. 8 is a diagram of a decoder 800 including a ring buffer 802, an FEC decoder 804, a video decoder 806 and a video render 808. The ring buffer 802 can receive packets of frames 204 of an encoded video bitstream 322 and temporarily store the packets. The ring buffer 802 can emit frames 204 of encoded video bitstream data to the FEC decoder 804. The FEC decoder can detect and correct missing or corrupt packets of the encoded video bitstream 322 and emit frames 204 of encoded video bitstream data to the video decoder 806. Video decoder 806 can be a video decoder as shown in FIG. 4, for example. Video decoder 806 emits frames of decoded video data to video renderer 808 to be rendered and displayed on a display operatively connected to computing device 14, for example.

Figure 6:
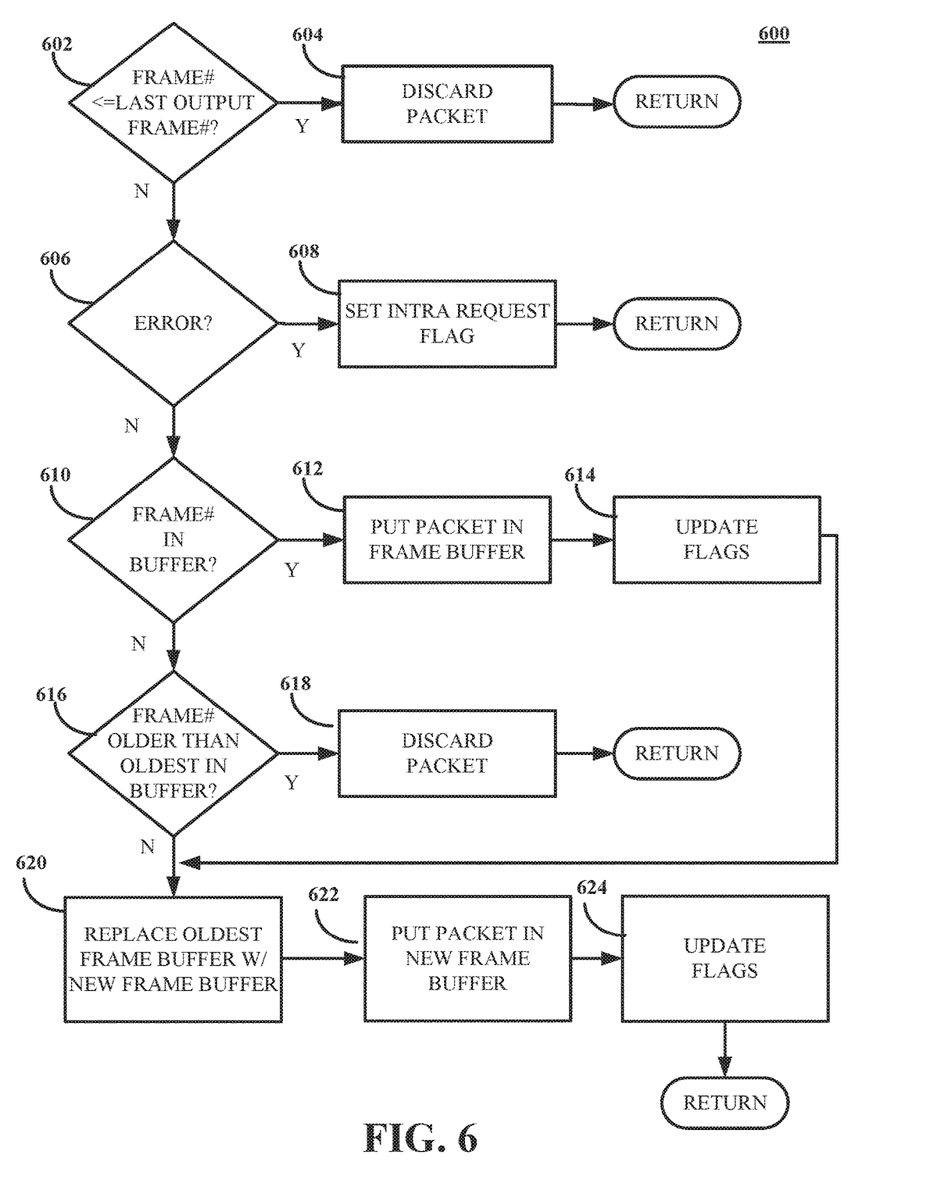
FIG. 6 is a flowchart showing video decoding processing using a ring buffer in accordance with aspects of disclosed implementations.

Returning to FIG. 5, at step 502, ring buffer 802 receives, at a computing device 14 for example, one or more packets associated with frames 204 of an encoded video bitstream 322. By receiving we can mean inputting, acquiring, reading, accessing or in any manner receiving an encoded video bitstream. The encoded video bitstream can be encoded by computing device 12 using encoder 300 and transmitted via network 16, for example. At step 504, process 500 can determine whether one or more frames 204 are associated with the one or more packets. FIG. 6 is a flowchart diagram of a process 600 for associating one or more frames 204 with the one or more packets.

FIG. 6 begins at step 602 by examining the one or more received packets and associating a frame number with the one or more received packets. When packets are formed by an encoder 300, they are marked to identify the frame with which they are associated. Upon receipt of the one or more packets, the packets can be examined and the frame number of the frame with which they are associated can be determined. At step 602, the associated frame number is examined and checked against the frame numbers of the frames currently stored in the ring buffer 802. If the associated frame number is less than or equal to the frame number of the last frame output from the ring buffer, the one or more packets are discarded at step 604 and process 600 returns to step 504 of process 500.

If the associated frame number is greater than the frame number of the last frame output from the ring buffer 802, at step 606, the ring buffer 802 can check the network and determine if a network error has occurred. Network errors can include missing packets, which can be determined by packet sequence numbers associated with each packet being received out of order, for example. Network errors can also be detected by the network 16 or computing devices 12 or 14 and the error information passed to the ring buffer 802. In either case, at step 608, the ring buffer 802 can set an intra request flag to request re-transmission of missing or corrupt data by sending an out-of-band message to the encoder 300. Following this, the process 600 can return to step 504 of process 500.

Figure 9:
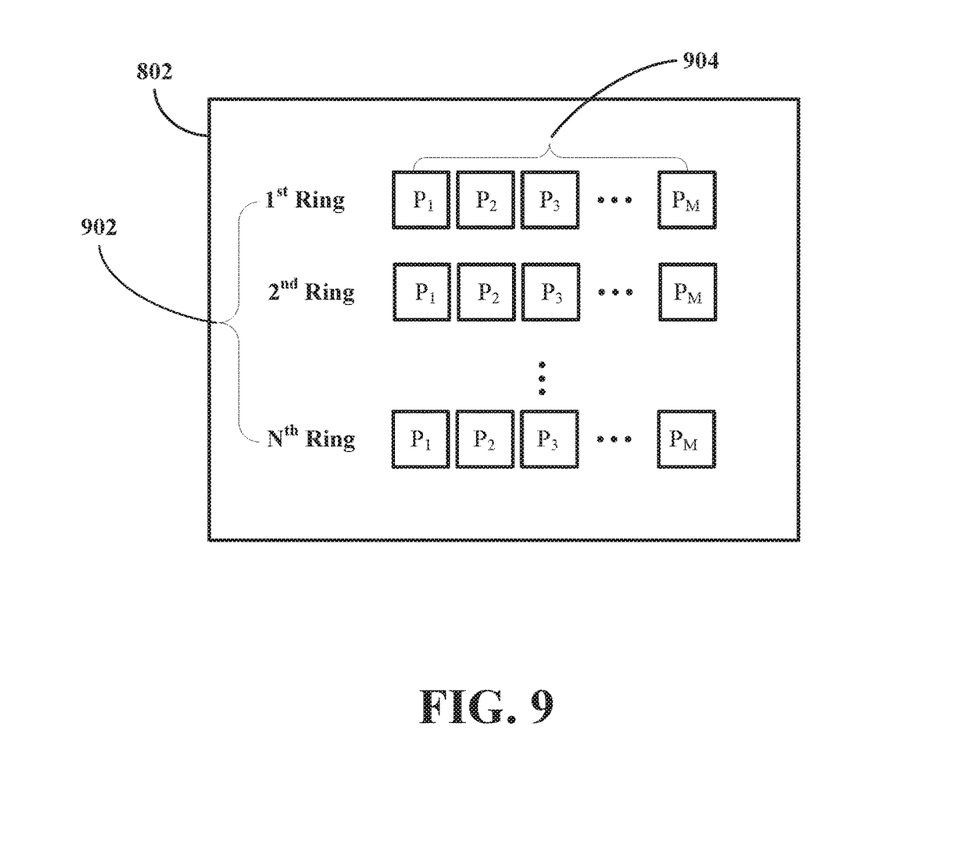
FIG. 9 is a diagram of a ring buffer in accordance with aspects of disclosed implementations.

At step 610, the process 600 can check the associated frame number to determine if the frame associated with the one or more packets is currently stored in the ring buffer 802. FIG. 9 is a diagram of ring buffer 802. Ring buffer 802 includes a plurality of frames stored in frame buffers 902 (or "rings 902"). The frame buffers 902 includes rings (or "frame buffers") 1 through N, each ring operative to store a frame identified by a frame number. Each ring includes a plurality of packets 904, identified as packets P$_1$ through P$_m$. Ring buffer 802 can store a plurality of frames in frame buffers 902 and add received packets to the appropriate frame buffer.

Returning to FIG. 6, at step 612, the one or more packets received by ring buffer 802 and associated with a frame number currently being stored in the ring buffer 802 are stored in the appropriate ring or frame buffer. At step 614, flags associated with the ring buffer are updated to reflect the state of the associated frame. Updated flags can include "all_data_packets" flags and "this_frame_is_ready" flags which indicate the status of each frame in the ring buffer 802. The ring buffer 802 can determine whether to output frames depending, at least in part, upon the state of the flags. Following updating flags, process 600 can pass to step 620 to output frames.

If, at step 610, it is determined that the associated frame number is not in the ring buffer 802, at step 616, the associated frame number is checked to see if it is older than the oldest frame number in the ring buffer 802. This can be the case if packets are received out of order or are being re-transmitted, for example. If it is, the frame associated with the packet has already been output to the FEC decoder and, at step 618, the one or more packets are discarded. The process 600 can then return to step 504 of process 500.

If, at step 616, it is determined that the packet is not older than the oldest frame number in the ring buffer 802, at step 620, the oldest frame buffer in the ring buffer 802 is replaced with a new frame buffer bearing the associated frame number of the one or more packets. At step 622, the one or more packets 904 are stored in the new frame buffer, and, at step 624, the "all_data_packets" and "this_frame_is_ready" flags are updated. Process 600 can then return to step 504 of process 500.

Figure 7:
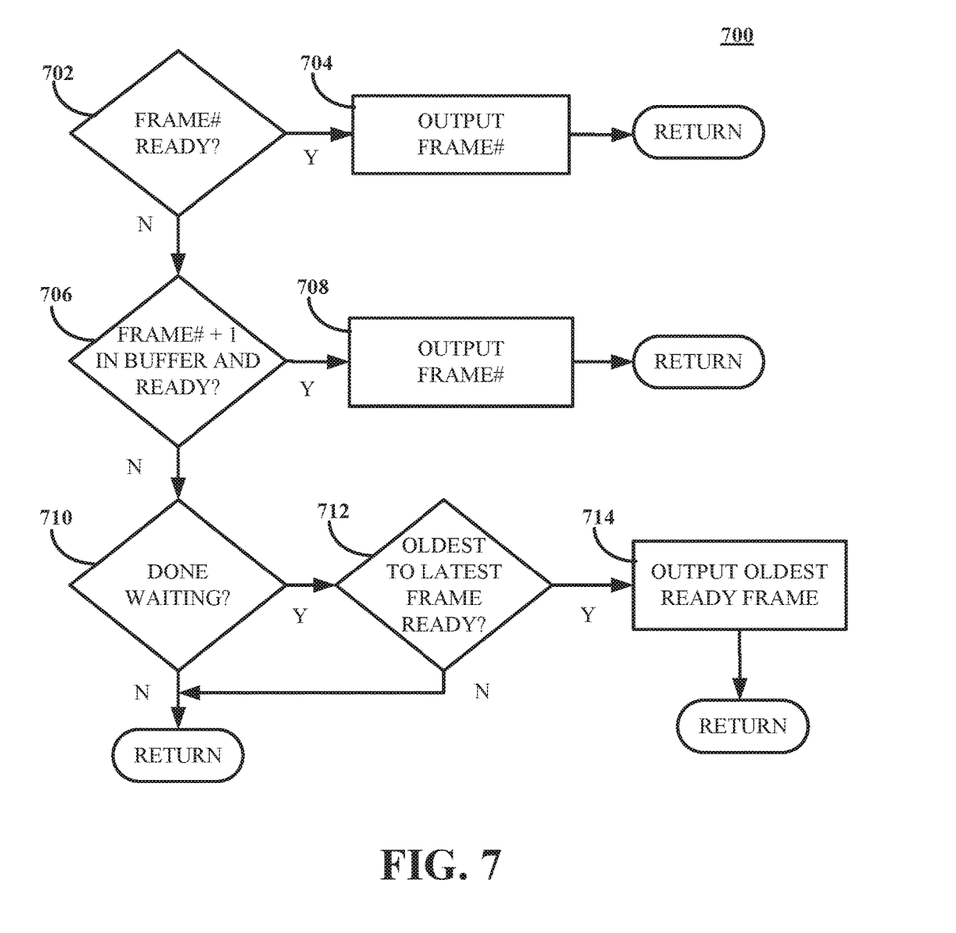
FIG. 7 is a flowchart showing video decoding processing using a ring buffer in accordance with aspects of disclosed implementations.

Returning to FIG. 5, at step 506, process can output frames from ring buffer 802 to FEC decoder 804. FIG. 7 is a flowchart of a process 700 for determining whether to output the one or more frames from the ring buffer 802 to an FEC decoder based on the one or more packets frames. At step 702, the flags updated steps 614 and/or 624 are checked to see if the current frame is ready for output. If the current frame is ready, and if the previous or next older frame has been output, at step 704, the frame is output to FEC decoder 804. Following outputting the frame, process 700 returns to step 506 of process 500.

At step 706, process 700 checks flags to determine if the frame number+1 or next newer frame number is ready for output. If the next newer frame is ready, that frame is output and process 700 returns to step 506 of process 500. If the next newer frame is not ready for output, at step 710, process checks to see if a predetermined period of time has expired. If the predetermined period of time has expired, the timer is reset and process 700 is done waiting and, at step 712, the frames of the frame buffer from oldest to newest are checked to determine if they are ready for output. If a ready frame is found at step 714, the oldest frame is output to FEC decoder 804 and process 700 returns to step 506 of process 500. If the predetermined period of time has not expired, the process 700 returns to step 506 of process 500.

Returning to FIG. 5, at step 508, FEC decoder 804 can perform FEC decoding on the frames of video bitstream data output from ring buffer 802. At step 510, video decoder 806 can decode the FEC decoded video bitstream to form a decoded video stream. The decoded video stream can be rendered for display, at step 512, by video renderer 808. At step 514, process 500 can check to see if more packets of the video bitstream are available and if so, return to step 512 to receive more packets. If no more packets are available, process 500 can exit.

The implementations of encoding and decoding described above illustrate some exemplary encoding and decoding techniques. However, encoding and decoding, as those terms are used in the claims, could mean compression, decompression, transformation, or any other processing or change of data.

The words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

The implementations of computing devices 12, 14, 26 and/or 28 and the algorithms, methods, instructions, and such stored thereon and/or executed thereby can be realized in hardware, software, or any combination thereof. The hardware can include, for example, computers, intellectual property (IP) cores, ASICs, programmable logic arrays, optical processors, programmable logic controllers, microcode, microcontrollers, servers, microprocessors, digital signal processors or any other suitable circuit. In the claims, the term "processor" encompasses any of the foregoing hardware, either singly or in combination. The terms "signal" and "data" are used interchangeably. Further, portions of computing devices 12, 14, 26 and/or 28 do not necessarily have to be implemented in the same manner.

Further, in one implementation, for example, computing devices 12, 14, 26 and/or 28 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Computing devices 12, 14, 26 and/or 28 can, for example, be implemented on computers in a screencasting system. Alternatively, computing device 12 can be implemented on a server and computing devices 14, 26 and/or 28 can be implemented on a device separate from the server, such as a cell phone or other hand-held communications device. In this instance, computing device 12 can encode content using an encoder 300 into an encoded video signal and transmit the encoded video signal to the communications device. In turn, the communications device can then decode the encoded video signal using decoder 400. Alternatively, the communications device can decode content stored locally on the communications device, such as content that was not transmitted by computing device 12. Other suitable computing devices 12, 14, 26 and/or 28 implementation schemes are available. For example, computing devices 14 can be a generally stationary personal computer rather than a portable communications device and/or a device including encoder 300 may also include decoder 400.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for decoding a video sequence with a computing device, comprising:
   receiving, by a ring buffer of the computer device, a packet associated with a frame of the video sequence, the frame having a frame number, and
      the ring buffer including a plurality of frame buffers, each frame buffer including respective packets of a respective frame,
      the each frame buffer of the frame buffers corresponding to a respective frame number, and
      each of the respective packets having the same respective frame number;
   based on a determination that the frame occurs later in time than a most recent frame outputted from the ring buffer to a forward-error-correction (FEC) decoder, determining whether the frame is stored in the ring buffer;
   based on a determination that the frame is stored in the ring buffer, determining whether all packets associated with the frame have been received by the ring buffer;
   based on a determination that all packets associated with the frame have been received by the ring buffer and that a preceding frame has been outputted from the ring buffer, outputting the frame from the ring buffer, wherein the preceding frame occurs immediately prior to the frame in the video sequence;
   based on a determination that the frame number is not older than the oldest frame number in the ring buffer:
      deleting contents of one frame buffer corresponding to the oldest frame number, wherein deleting the contents of the one frame buffer comprises discarding, without sending to the FEC decoder, all packets of the one frame buffer;
      adding the packet to the one frame buffer; and
      associating the one frame buffer with the frame number;
   receiving, by the FEC decoder, the frame outputted by the ring buffer;
   generating, by the FEC decoder, an FEC decoded frame by performing FEC on the frame;
   outputting, by the FEC decoder, the FEC decoded frame to a video decoder;
   outputting, by the video decoder, a decoded frame to a renderer;
   and
   based on a determination that not all packets associated with the frame have been received by the ring buffer and based on a determination that a predetermined period has expired, determining whether to output frames stored in the ring buffer from earliest to latest based on the respective frame numbers.

2. The method of claim 1, further comprising:
   based on a determination that the frame does not occur later than the most recent frame outputted from the ring buffer, discarding the packet.

3. The method of claim 1, further comprising:
   based on a determination that the frame is not stored in the ring buffer, determining whether the frame occurs earlier than the oldest frame, based on the respective frame numbers, in the ring buffer; and
   based on a determination that the frame occurs earlier than the oldest frame in the ring buffer, discarding the packet.

4. The method of claim 3, further comprising:
   based on a determination that the frame does not occur earlier than the oldest frame in the ring buffer, storing the packet in a corresponding frame of the ring buffer, wherein the corresponding frame corresponds to the frame.

5. The method of claim 1, wherein determining whether the frame is stored in the ring buffer comprises:
   based on a determination that the frame occurs later than the most recent frame outputted from the ring buffer, determining whether the packet is associated with any network error;
   based on a determination that the packet is not associated with any network error, determining whether the frame is stored in the ring buffer; and
   based on a determination that the packet is associated with a network error, determining flag data associated with the ring buffer for requesting re-transmission of the packet from a sender of the video sequence.

6. The method of claim 1, further comprising:
   based on a determination that all packets associated with the frame have been received by the ring buffer and that the preceding frame has not been outputted, determining whether all packets associated with a subsequent frame of the most recent frame outputted from the ring buffer have been received by the ring buffer; and
   based on a determination that all packets associated with the subsequent frame of the most recent frame outputted from the ring buffer have been received by the ring buffer, outputting the subsequent frame of the most recent frame outputted from the ring buffer.

7. The method of claim 6, further comprising:
   based on a determination that not all packets associated with the subsequent frame of the most recent frame outputted from the ring buffer have been received by the ring buffer, outputting the oldest frame of ready frames from the ring buffer, wherein all packets associated with the ready frames have been received by the ring buffer.

8. A system for decoding a video sequence, comprising:
   a computer comprising a ring buffer, wherein the ring buffer is configured to:
      receive a packet associated with a frame of the video sequence, the frame having a frame number;
      based on a determination that the frame occurs later in time than a most recent frame outputted from the ring buffer to a forward error correction (FEC) decoder, determine whether the frame is stored in the ring buffer;

based on a determination that the frame is stored in the ring buffer, determine whether all packets associated with the frame have been received by the ring buffer;

based on a determination that all packets associated with the frame have been received by the ring buffer and that a preceding frame has been outputted from the ring buffer, output the frame from the ring buffer to the FEC decoder, wherein the preceding frame occurs immediately prior to the frame in the video sequence;

based on a determination that the frame number is not older than the oldest frame number in the ring buffer:
 delete contents of one frame buffer corresponding to the oldest frame number, wherein to delete the contents of the one frame buffer comprises to discard, without sending to the FEC decoder, all packets of the one frame buffer;
 add the packet to the one frame buffer; and
 associate the one frame buffer with the frame number;

the FEC decoder, configured to:
 receive the frame outputted by the ring buffer;
 generate an FEC decoded frame by performing FEC on the frame; and
 output the FEC decoded frame to a video decoder; and a renderer, configured to:
 receive the decoded frame outputted by the video decoder; and
 render the decoded frame for display on a display in communication with the computer; and
 based on a determination that not all packets associated with the frame have been received by the ring buffer and based on a determination that a predetermined period has expired, determine whether to output frames stored in the ring buffer from earliest to latest based on comparison or the respective frame numbers.

9. The system of claim 8, wherein the ring buffer is further configured to:
 based on a determination that the frame does not occur later than the most recent frame outputted from the ring buffer, discard the packet.

10. The system of claim 8, wherein the ring buffer is further configured to:
 based on a determination that the frame is not stored in the ring buffer, determining whether the frame occurs earlier than the oldest frame in the ring buffer; and
 based on a determination that the frame occurs earlier than the oldest frame in the ring buffer, discarding the packet.

11. The system of claim 8, wherein the ring buffer is further configured to:
 based on a determination that the frame does not occur earlier than the oldest frame in the ring buffer, store the packet in a corresponding frame of the ring buffer, wherein the corresponding frame corresponds to the frame.

12. The system of claim 8, wherein the ring buffer configured to determine whether the frame is stored in the ring buffer is further configured to:
 based on a determination that the frame occurs later than the most recent frame outputted from the ring buffer, determine whether the packet is associated with any network error;
 based on a determination that the packet is not associated with any network error, determine whether the frame is stored in the ring buffer; and
 based on a determination that the packet is associated with a network error, determine flag data associated with the ring buffer for requesting re-transmission of the packet from a sender of the video sequence.

13. The system of claim 8, wherein the ring buffer is further configured to:
 based on a determination that all packets associated with the frame have been received by the ring buffer and that the preceding frame has not been outputted, determine whether all packets associated with a subsequent frame of the most recent frame outputted from the ring buffer have been received by the ring buffer; and
 based on a determination that all packets associated with the subsequent frame of the most recent frame outputted from the ring buffer have been received by the ring buffer, output the subsequent frame of the most recent frame outputted from the ring buffer to the FEC decoder.

14. The system of claim 13, wherein the ring buffer is further configured to:
 based on a determination that not all packets associated with the subsequent frame of the most recent frame outputted from the ring buffer have been received by the ring buffer, determine whether a predetermined period of time expires; and
 based on a determination that the predetermined period of time expires, output the oldest frame of ready frames from the ring buffer to the FEC decoder, wherein all packets associated with the ready frames have been received by the ring buffer.

15. An apparatus for decoding a video sequence, comprising:
 a processor; and
 a memory coupled to the processor, the memory configured to store instructions which when executed by the processor become operational with the processor to:
  receive, at a ring buffer connected to the processor and the memory, a packet associated with a frame of the video sequence, the frame having a frame number;
  based on a determination that the frame number is greater than a first frame number of a most recent frame outputted from the ring buffer to a forward error correction (FEC) decoder, determine whether the frame is stored in the ring buffer;
  based on a determination that the frame is stored in the ring buffer, determine whether all packets associated with the frame have been received by the ring buffer;
  based on a determination that the frame number is not older than the oldest frame number in the ring buffer:
   deleting contents of one frame buffer corresponding to the oldest frame number, wherein deleting the contents of the one frame buffer comprises discarding, without sending to the FEC decoder, all packets of the one frame buffer;
   adding the packet to the one frame buffer; and
   associating the one frame buffer with the frame number;
  based on a determination that all packets associated with the frame have been received by the ring buffer and that a preceding frame has been outputted from the ring buffer, output the frame from the ring buffer, wherein the preceding frame occurs immediately prior to the frame in the video sequence;

receive, by the FEC decoder, the frame outputted by the ring buffer;

generate, by the FEC decoder, an FEC decoded frame by performing FEC on the frame; and based on a determination that not all packets associated with the frame have been received by the ring buffer and based on a determination that a predetermined period has expired, determine whether to output frames stored in the ring buffer.

16. The apparatus of claim 15, wherein the memory further comprises instructions which when executed by the processor become operational with the processor to:

based on a determination that the frame does not occur later than the most recent frame outputted from the ring buffer, discard the packet.

17. The apparatus of claim 15, wherein the memory further comprises instructions which when executed by the processor become operational with the processor to:

based on a determination that the frame is not stored in the ring buffer, determine whether the frame occurs earlier than the oldest frame in the ring buffer; and based on a determination that the frame occurs earlier than the oldest frame in the ring buffer, discarding the packet.

18. The apparatus of claim 17, wherein the memory further comprises instructions which when executed by the processor become operational with the processor to:

based on a determination that the frame does not occur earlier than the oldest frame in the ring buffer, store the packet in a corresponding frame of the ring buffer, wherein the corresponding frame corresponds to the frame.

19. The apparatus of claim 15, wherein the memory further comprises instructions which when executed by the processor become operational with the processor to:

based on a determination that the frame occurs later than the most recent frame outputted from the ring buffer, determining whether the packet is associated with any network error;

based on a determination that the packet is not associated with any network error, determine whether the frame is stored in the ring buffer; and based on a determination that the packet is associated with a network error, determine flag data associated with the ring buffer for requesting re-transmission of the packet from a sender of the video sequence.

20. The apparatus of claim 15, wherein the memory further comprises instructions which when executed by the processor become operational with the processor to:

based on a determination that all packets associated with the frame have been received by the ring buffer and that the preceding frame has not been outputted, determining whether all packets associated with a subsequent frame of the most recent frame outputted from the ring buffer have been received by the ring buffer;

based on a determination that all packets associated with the subsequent frame of the most recent frame outputted from the ring buffer have been received by the ring buffer, output the subsequent frame of the most recent frame outputted from the ring buffer; and based on a determination that not all packets associated with the subsequent frame of the most recent frame outputted from the ring buffer have been received by the ring buffer, output the oldest frame of ready frames from the ring buffer, wherein all packets associated with the ready frames have been received by the ring buffer.

* * * * *